Figure 1:
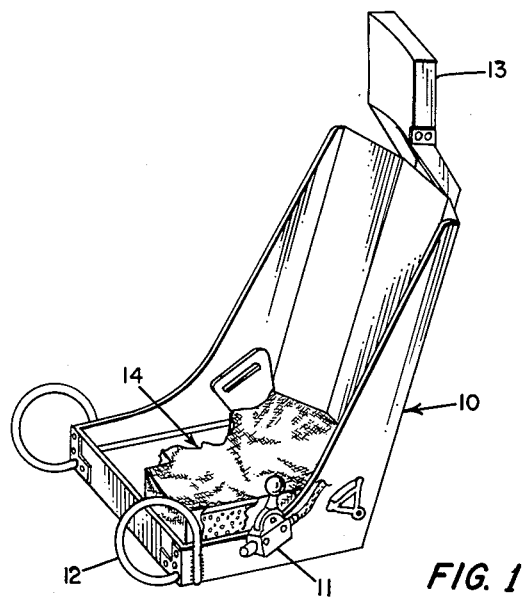

April 25, 1961   E. O. CARTWRIGHT, JR., ET AL   2,981,317
SHOCK ABSORBING SAFETY SEAT
Filed Nov. 22, 1957

INVENTORS.
Edwin O. Cartwright, Jr.
Harold H. Edwards, Jr.
Samuel F. Held
BY J. H. Nichols
AGENT

United States Patent Office 2,981,317
Patented Apr. 25, 1961

2,981,317

SHOCK ABSORBING SAFETY SEAT

Edwin O. Cartwright, Jr., Harold H. Edwards, Jr., and Samuel F. Held, Dallas, Tex., assignors to Chance Vought Corporation, a corporation of Delaware Filed Nov. 22, 1957, Ser. No. 698,100

6 Claims. (Cl. 155—178)

This invention pertains to a safety seat for absorbing the kinetic energy of the occupant of the seat during an abnormally hard jolt or crash landing. More specifically, the invention includes a pilot's safety seat having a seat cushion comprising a block of brittle, non-elastic material that will crush and thus absorb the energy of approximately a twenty-g (twenty times the pull of gravity) vertical deceleration with no undesirable induced dynamic effects of rebound on the pilot. The term deceleration is actually acceleration in a direction opposite to the direction of motion. That is, when a body is accelerated it is always either speeding up or slowing down.

A primary object of this invention is to provide a safety seat that will absorb the shock of a high vertical acceleration or deceleration without injury to the occupant.

Another object of this invention is to provide a safety seat having a crushable cushion therein for absorbing the shock of a crash landing without providing the detrimental effects of rebound or recoil to the occupant.

Yet another object of this invention is to provide a safety seat having a non-elastic energy absorbing means for use in the prevention of injury to life and/or property subject to a high acceleration or deceleration and for providing a uniform rate of energy absorption for safely absorbing the energy resulting from such rapid change of movement due to a crash or exceptionally hard landing.

A still further object of this invention is to provide a safety seat having a crushable non-elastic energy absorbing means having high total energy absorption, low unit weight, few parts, simplicity, ease of installation, very low weight-cost factor, virtually no maintenance requirements, low monetary cost, entirely automatic, requiring no operation or training of the occupant, permanent and uniform operating characteristics, accurate predetermined energy absorption values, and usefulness for testing equipment subjected to forces comparable to those met under actual operating conditions.

Another object of the invention is to provide an energy absorbing aircraft safety seat that is positive in operation, convenient to use, easily installed, and economical to manufacture.

Other objects and various advantages of the disclosed energy absorbing safety seat will be apparent from the following detailed description, together with the accompanying drawings, submitted for purposes of illustration only and not intended to define the scope of the invention, reference being had for that purpose to the subjoined claims.

Briefly, the energy absorbing safety seat which is particularly adaptable for use in aircraft comprises a conventional aircraft seat, for example, with the rubber seat cushion removed and a crushable cushion substituted therefor. The cushion comprises principally a block of crushable, non-elastic material such as an expanded brittle plastic that is strong enough to withstand the downward force thereon by a person sitting on it but will crush upon application of a high force, such as a twenty-g downward deceleration due to a crash landing in an aircraft for example, and a thinner pad of compressible material having a slow springback and that will withstand downward forces of a lesser degree of intensity for automatically absorbing the high kinetic energy of the occupant of the seat and for eliminating injurious rebound of the occupant.

Figure 2:
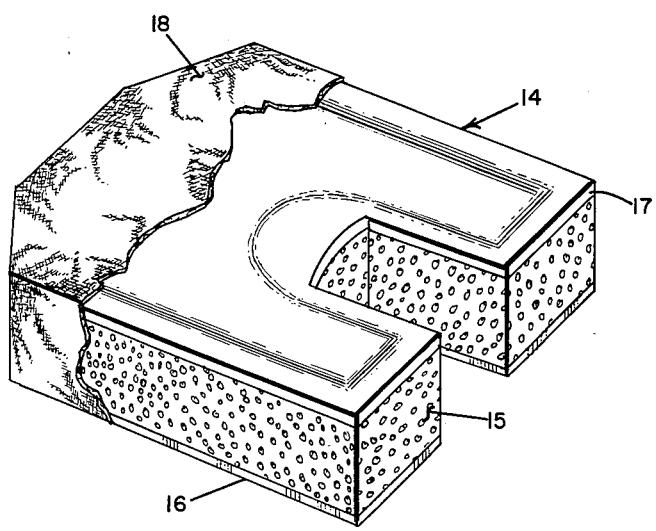

The drawing diagrammatically illustrates by way of example, not by way of limitation, a form of the invention wherein like reference numerals designate corresponding parts in the several views in which Fig. 1 is a perspective view of an energy absorbing safety seat with the crushable non-elastic cushion therein; and Fig. 2 is a perspective view of the crushable cushion.

The invention disclosed herein is not limited in its application to the details of construction and arrangement of parts illustrated in the accompanying drawings, since the invention is capable of other embodiments and of being practiced or carried out in various other ways. Also it is to be understood that the phraseology or terminology employed herein is for the purpose of description and not of limitation.

Fig. 1 discloses a seat 10, such as an aircraft seat for example with the rubber pad removed. While this seat may be any conventional seat or chair for use in vehicles of transportation, a conventional aircraft pilot ejection seat is illustrated having manual controls 11, leg braces 12, and a head rest 13.

From the bottom of the safety seat any pad therein is removed and an energy absorbing, crushable, brittle material cushion 14 is inserted. This cushion, shown in greater detail in Fig. 2, comprises principally a block of light-weight crushable, non-elastic, material 15 such as but not limited to "Stafoam," an expanded crushable plastic or a resinous polymer comprising a semi-rigid polyurethane foam having open or closed cellular structure manufactured by American Latex Products Corporation, Hawthorne, California. An exemplary material for use in aircraft safety seat cushions is one which will yield without storing energy upon application of a pressure of substantially 50 p.s.i. in providing a uniform rate of energy absorption from a minimum deceleration of approximately twenty-g for the average size occupant. Accordingly, the material then would be very serviceable and should not sustain damage due to normal usage. Other suitable non-elastic crushable materials may be used such as foamed resins, i.e., expanded thermoplastic vinyl resins, polyester, modified polyesters, phenolic, silicone, etc., or cellular cellulose acetate, foam glass, glass fiber or the like, some of which are disclosed in the safety line shock absorber of Patent 2,724,463.

A metal wear plate 16, such as aluminum, or the like, is secured to the bottom of the block of crushable material 15 as by bonding.

The top surface of the block of crushable material has a compressible comfort pad 17 secured thereto as by bonding or the like. This pad 17 should be compressible for comfort and having only enough springback to ensure the pad's return to its original shape. An exemplary material is a compressible cellular material with a slow springback as compared to natural rubber such as "Ensolite" a resinous polymer comprising rigid or semi-rigid polyurethane foam having open cellular structure manufactured by The Goodyear Tire & Rubber Company of Mishawaka, Indiana. While pad 17 serves a principal purpose of providing comfort to the occupant sitting on the block of crushable material, the pad also adds a layer of shock absorbing material with a slow springback which is effective to provide a uniform rate of energy absorption for less force than that required to crush the block 15.

Over all of the seat cushion is secured a cover material 18 such as leather, fire resistant cotton ducking, or the like.

In use or operation of the safety seat, as in aircraft for example, the occupant or pilot sits on the seat cushion 14 in the aircraft seat 10 while flying. Then during landings, if a particularly hard or crash landing is involved having a minimum vertical deceleration of approximately 20 G, the kinetic energy of the pilot is substantially absorbed by the seat cushion as the energy absorbing, plastic, non-elastic cushion crushes between the pilot and the bottom of the seat 10. In a twenty-g force crash landing, a two inch thick block of crushable material, for example, normally would crush not over an inch due to the short period of time over which the deceleration occurs. Crash landings of greater than twenty-g would merely result in the material being crushed to a greater depth in providing the uniform rate of energy absorption. Thus various thicknesses may be used, depending on the amount of protection desired and space available. While safety seats have been suggested for absorption of forward deceleration due to sudden impact as disclosed in Patent 2,682,931, our safety seat absorbs vertical shock or deceleration with much simpler and efficient equipment. The rubber seat cushion used hereinbefore is unsatisfactory for absorbing high vertical g forces due to the resulting rebound of the occupant which induces undesirable dynamic effects, commonly referred to as the "back-breaking jolt or rebound." While the new seat cushion absorbs high vertical g forces when the safety seat is upright, regardless of the angular position of the seat during a high acceleration, the energy absorption would be substantially normal to the bottom of the seat. Likewise, due to the thickness of the seat cushion, auxiliary or emergency equipment may be attached to the sides thereof or embedded in the edges thereof, such as an oxygen bottle and the like. Accordingly, except for the insertion of auxiliary and emergency equipment, if desired, the safety seat cushion comprises a solid block of crushable non-elastic material extending over a majority of the horizontal area of the seat cushion.

Accordingly, a safety seat has been disclosed for automatically absorbing the high kinetic energy of the occupant of a seat and for eliminating injurious rebound of the occupant. Also the disclosed safety seat has a non-elastic, high total energy absorbing cushion having low unit weight, few parts, convenient, easily installed, little maintenance, great simplicity, requires no personnel training, and is economical to manufacture to prevent occupant injury from high accelerations or decelerations by providing a uniform rate of energy absorption.

While only one embodiment of the invention has been shown in the accompanying drawing, it will be evident that various modifications are possible in the arrangement and construction of the high total energy absorption safety seat without departing from the scope of the invention.

We claim:

1. A safety seat having a bottom, energy absorbing means in said bottom, said energy absorbing means comprising means for absorbing shock forces due to acceleration of said seat in a direction substantially normal to said bottom of said safety seat, said energy absorbing means comprising a seat cushion, said seat cushion comprising a seat cushion comprising a block of crushable non-elastic material, said crushable non-elastic material being a solid block extending over a majority of the horizontal area of the seat cushion, a rigid metal plate secured to the bottom of said block, a compressible pad secured to the top of said block, said compressible pad having a slow springback, and a cover of flexible material enclosing said seat cushion.

2. An energy absorbing means for use in a safety seat, said energy absorbing means comprising a seat cushion for absorption of forces from a high vertical acceleration, said seat cushion including a block of crushable non-elastic material, said crushable non-elastic material being a solid block extending over a majority of the horizontal area of the seat cushion, a rigid member secured to the bottom of said block, a compressible member secured to the top of said block, and a flexible cover enclosing said block said rigid member and said resilient member.

3. A safety seat for an occupant comprising energy absorbing seat means, said means comprising crushable non-elastic means, said crushable non-elastic material being a solid block extending over a majority of the horizontal area of the seat, rigid means secured to the bottom of said crushable means, and compressible means secured to the top of said crushable means for providing a uniform rate of energy absorption between the occupant and said safety seat during a high vertical acceleration and flexible means enclosing said energy absorbing means.

4. An aircraft safety seat having a bottom, energy absorbing means in said bottom, said energy absorbing means comprising means for absorbing shock forces due to deceleration of said seat in a direction substantially normal to said bottom of said safety seat, said energy absorbing means comprising a seat cushion, said seat cushion comprising a block of crushable non-elastic plastic material, said crushable non-elastic material being a solid block extending over a majority of the horizontal area of the seat cushion, a rigid metal plate bonded to the bottom of said block for resting on said bottom of said safety seat, a compressible comfort pad bonded to the top of said block, and a fabric cover enclosing said seat cushion.

5. A safety seat as recited in claim 1 wherein said compressible pad having a slow spring-back comprises an open cellular polyurethane resinous polymer foam.

6. A safety seat for an occupant comprising energy absorbing seat means, said means comprising crushable non-elastic means, said crushable non-elastic means being a solid block extending over a majority of the horizontal area of the seat cushion, rigid means secured to the bottom of said crushable means, and compressible means secured to the top of said crushable means for providing a uniform rate of energy absorption between the occupant and said safety seat during a high vertical acceleration.

References Cited in the file of this patent

UNITED STATES PATENTS

| | | |
|---|---|---|
| 1,711,085 | D'Arcy | Apr. 30, 1929 |
| 2,625,683 | Reth et al. | Jan. 20, 1953 |
| 2,637,368 | Cotton | May 5, 1953 |
| 2,724,463 | Becker | Nov. 22, 1955 |
| 2,832,398 | Liljengren | Apr. 28, 1958 |
| 2,833,339 | Liljengren | May 6, 1958 |
| 2,840,194 | Mitchell et al. | June 24, 1958 |
| 2,849,058 | Bulleri et al. | Aug. 26, 1958 |
| 2,870,871 | Stevinson | Jan. 27, 1959 |